United States Patent
Lee et al.

(10) Patent No.: US 6,993,227 B2
(45) Date of Patent: Jan. 31, 2006

(54) FIBER OPTIC CABLE

(75) Inventors: Ho-Soon Lee, Taegukwangyok-shi (KR); Joong-Jin Hwang, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/425,696

(22) Filed: Apr. 29, 2003

(65) Prior Publication Data

US 2003/0206704 A1 Nov. 6, 2003

(30) Foreign Application Priority Data

May 3, 2002 (KR) .................................. 10-2002-24545

(51) Int. Cl.
 *G02B 6/44* (2006.01)

(52) U.S. Cl. ....................................................... 385/103
(58) Field of Classification Search .......... 385/100–114
 See application file for complete search history.

(56) References Cited

U.S. PATENT DOCUMENTS

| | | | |
|---|---|---|---|
| 4,781,433 A | 11/1988 | Arroyo et al. | 350/96.23 |
| 4,828,352 A | 5/1989 | Kraft | 350/96.23 |
| 6,293,081 B1 | 9/2001 | Grulick et al. | 57/293 |

FOREIGN PATENT DOCUMENTS

| | | |
|---|---|---|
| DE | 3324597 | 1/1985 |
| EP | 0833177 A1 | 4/1998 |

*Primary Examiner*—Khiem Nguyen
(74) *Attorney, Agent, or Firm*—Cha & Reiter, L.L.C.

(57) ABSTRACT

Disclosed is a fiber optic cable, comprising a central strength member, disposed at the center of the cable, for providing tensile strength; a plurality of inner tight buffered cores disposed in a linear form around the central strength member; a plurality of outer tight buffered cores, twisted in a spiral or S-Z form, for enclosing the inner tight buffered cores; and a jacket, disposed on an outermost circumference of the cable, for protecting an interior of the cable from external environments. The linear form of the inner tight buffered cores enclosed by the outer tight buffered cores, twisted in a spiral of S-Z form thereby providing a structure allowing the fiber optic cable to be maintained in a stable arrangement

12 Claims, 6 Drawing Sheets

FIBER OPTIC CABLE

CLAIM OF PRIORITY

This application claims priority to an application entitled "Fiber Optic Cable," filed in the Korean Industrial Property Office on May 3, 2002 and assigned Ser. No. 2002-24545, the contents of which are hereby incorporated by reference.

BACKGROUND OF THE INVENTION

1. Field of the Invention

The present invention relates to a fiber optic cable. More particularly, the invention relates to a fiber optic indoor/outdoor tight buffered cable.

2. Description of the Related Art

Fiber optic indoor/outdoor tight buffered cable is commonly employed for intra-building network applications, for example, for interconnecting between one central office and other offices. In general, optical fiber has advantages as compared with metallic cord in that it has a smaller diameter and a wider bandwidth. A disadvantage of optical fiber is that it is more vulnerable not only to tension in its longitudinal direction but also to external impact in its widthwise direction.

FIG. 1 is a cross-sectional view of a conventional fiber optic indoor/outdoor tight buffered cable. FIG. 2 is a side view of the fiber optic cable shown in FIG. 1. The fiber optic cable comprises a central strength member 110, nine inner tight buffered cores 120, fifteen outer tight buffered cores 130, an outer strength member 140 and a jacket 150.

The central strength member 110 is disposed at the center of the fiber optic cable so as to provide tensile strength.

The nine inner tight buffered cores 120 are disclosed, for example, in U.S. patent application Ser. No. 946,646, filed Dec. 22, 1986, and U.S. Pat. No. 4,781,433 issued Nov. 1, 1988 to Arroyo et al. incorporated by reference in their entirety. Both patents disclose an inner tight buffered core comprising a core 132, a cladding 134 and a tight buffered layer 136. In addition, the nine inner tight buffered cores 120 are disposed in a spiral form around the central strength member 110. That is to say, the nine inner tight buffered cores 120 are spirally twisted at a predetermined pitch.

The fifteen outer tight buffered cores 130 are also disposed in a spiral form to enclose the nine inner tight buffered cores 120. Therefore, the fifteen outer tight buffered cores 130 are spirally twisted at a predetermined pitch.

The outer strength member 140 is spirally wrapped to enclose the outer tight buffered cores 130, performing a damping function under external pressure.

The jacket 150 is formed around the circumference of the fiber optic cable by an extrusion process, in order to protect the interior of the cable from external environments.

A drawback of the fiber optic cable described above is that when the inner and outer tight buffered cores 120 and 130 are disposed in the same direction, they are disarrayed or have a poor flexible property. Furthermore, another drawback is that such a fiber optic cable is inefficient to produce owing to complicated production steps.

Therefore, there is a need in the art for a fiber optic cable which overcomes the afore-stated problems.

SUMMARY OF THE INVENTION

An improved fiber optic cable in which the inner and outer tight buffered cores can be maintained in a stable arrangement is therefore provided.

According to one embodiment of the invention, the fiber optic cable comprises a central strength member, disposed at the center of the cable, for providing tensile strength; a plurality of inner tight buffered cores disposed in a linear form around the central strength member; a plurality of outer tight buffered cores, twisted in a spiral or S-Z form, for enclosing the inner tight buffered cores; and a jacket, disposed on an outermost circumference of the cable, for protecting its inside from external environments.

According to another embodiment of the invention, the fiber optic cable comprises: a plurality of inner tight buffered cores disposed at the center of the cable and disposed in a linear form; a plurality of outer tight buffered cores, twisted in a spiral or S-Z form, for enclose the inner tight buffered c ores; and a jacket, disposed on an outermost circumference of the cable, for protecting its inside from external environments.

The fiber optic cable according to the present invention provides advantages over prior art constructions in that the inner tight buffered cores are disposed in a linear form, allowing a more simplified production method with an associated improved production rate. Moreover, the inner and outer tight buffered cores have a different direction of disposal from each other, they can maintain a stable arrangement.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purposes of clarity and simplicity, a detailed description of known functions and configurations incorporated herein will be omitted as it may make the subject matter of the present invention rather unclear.

Figure 1:
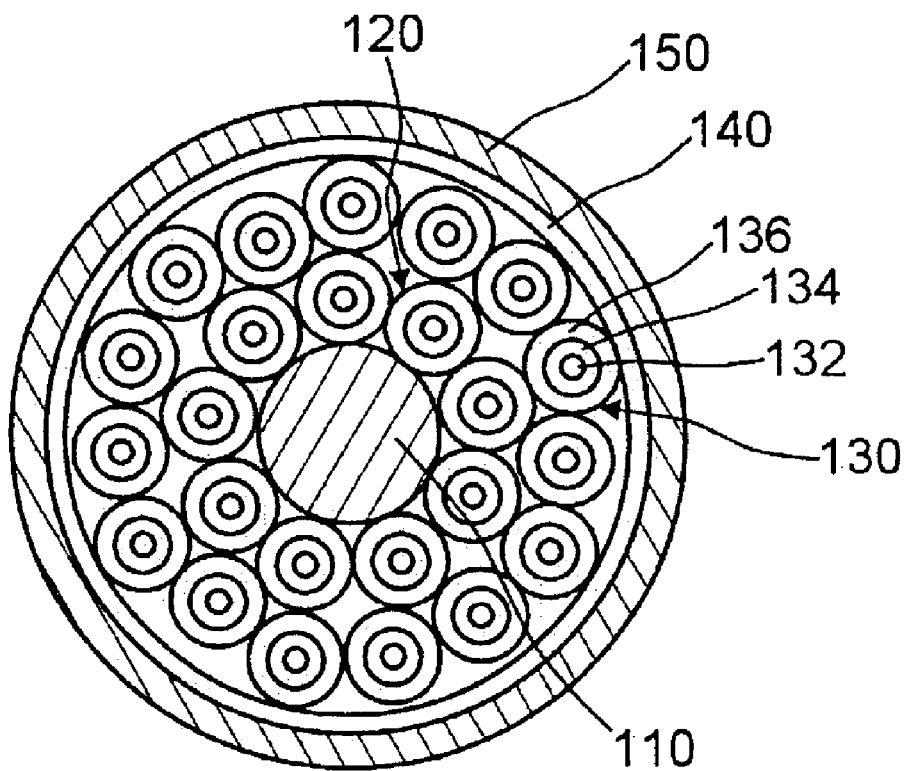
FIG. 1 is a cross-sectional view of a conventional fiber optic indoor/outdoor tight buffered cable.
Figure 2:
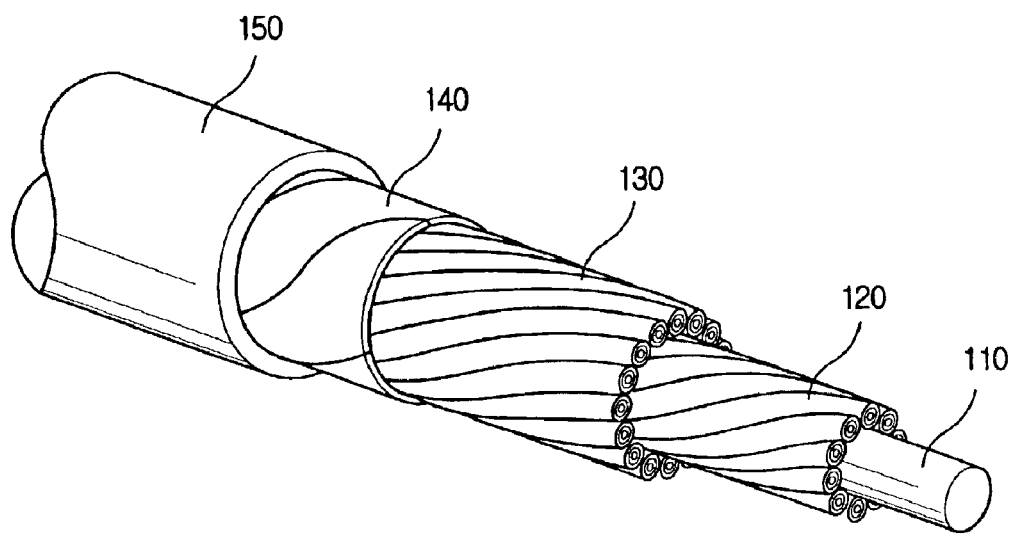
FIG. 2 is a side view of the fiber optic cable shown in FIG. 1.
Figure 3:
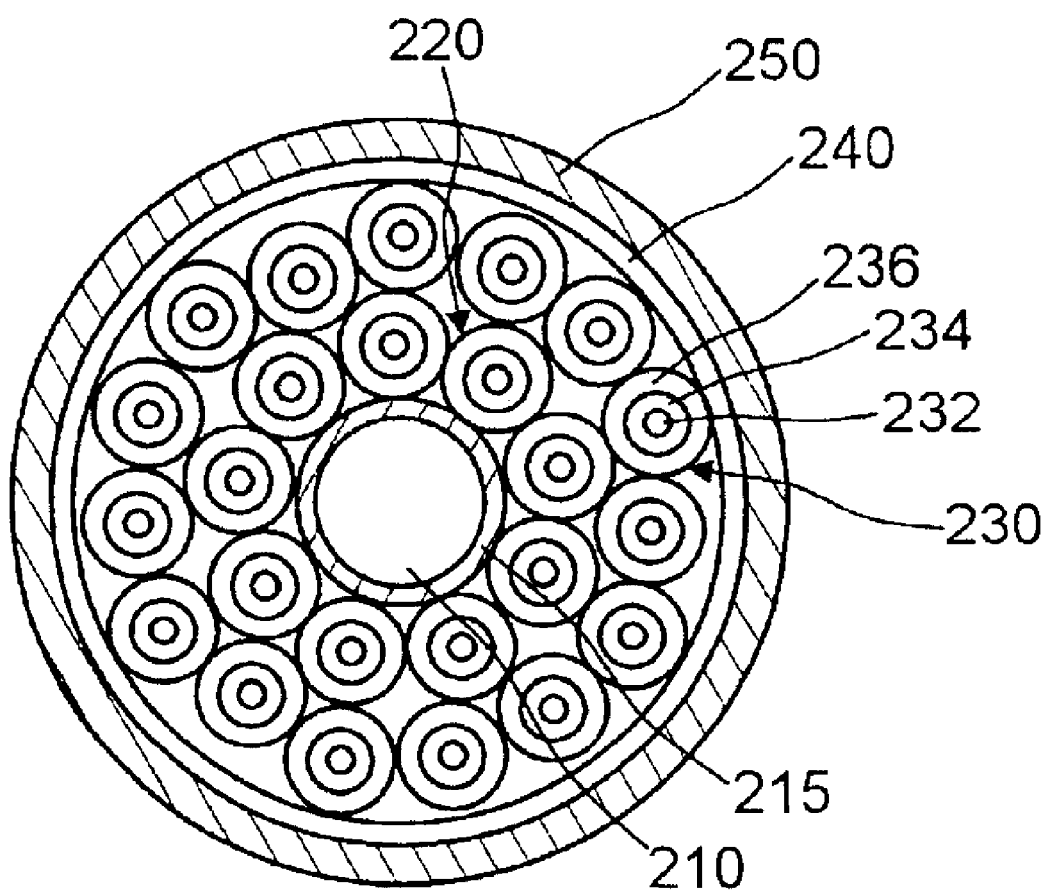
FIG. 3 is a cross-sectional view of a fiber optic indoor/outdoor tight buffered cable according to a first preferred embodiment of the present invention.
Figure 4:
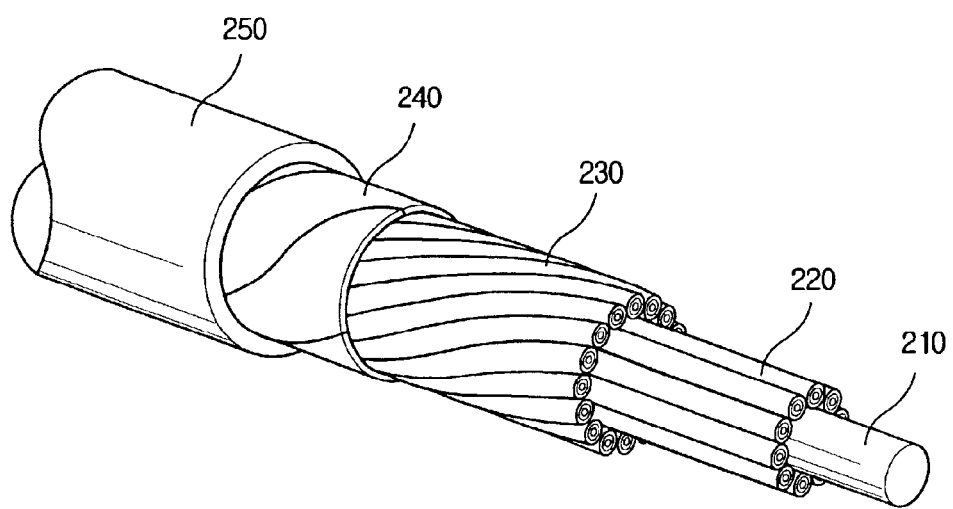
FIG. 4 is a side view of the fiber optic cable shown in FIG. 3.

FIG. 3 is a cross-sectional view of a fiber optic indoor/outdoor tight buffered cable according to a first preferred embodiment of the present invention. FIG. 4 is a side view of the fiber optic cable shown in FIG. 3. The fiber optic cable comprises a central strength member 210, nine inner tight buffered cores 220, fifteen outer tight buffered cores 230, an outer strength member 240 and a jacket 250. It is to be appreciated that other embodiments may have lesser or greater number of inner tight buffered cores and outer tight buffered cores and still be within the scope of the invention.

The central strength member 210 is disposed at the center of the fiber optic cable so as to provide tensile strength. The central strength member 210 may be made of fiberglass reinforced plastic (FRP), with a layer 215 of polymer combination coated on its circumferential surface, in which the polymer combination may be selected from any one of polyvinyl chloride (PVC), polyethylene (PE) and the like.

The nine inner tight buffered cores 220 individually comprise a core 232, a cladding 234 and a tight buffered layer 236. The tight buffered layer 236 may make use of a polymer mixture, such as PVC, hytrel, nylon, PE, polyester, polyolefin or the like. The inner tight buffered cores 220 are disposed in a form parallel to each other around the central strength member 210. That is to say, the inner tight buffered cores 220 are arranged in parallel to the central strength member 210.

The fifteen outer tight buffered cores 230 are also disposed in a spiral form to enclose the nine inner tight buffered cores 220. Therefore, the fifteen outer tight buffered cores 230 are spirally twisted at a predetermined pitch. Alternatively, the outer tight buffered cores 230 may be disposed in a S-Z form to enclose the inner tight buffered cores 220. This S-Z form is well known and disclosed in detail, for example, in U.S. Pat. No. 4,828,352, issued to Heinrich A. Kraft et al., incorporated by reference herein, and thus will not be further described herein.

The outer strength member 240 is spirally wrapped to enclose the outer tight buffered cores 230, functioning to attenuate an external pressure if applied. The outer strength member 240 may make use of aramid yarn or glass yarn as its material.

The jacket 250 is formed around the outermost circumference of the fiber optic cable by an extrusion process, in order to protect its inside from external environments. For the jacket 250, polymer combination, such as PVC, polyolefin, PE or the like, may be used.

In accordance with the principles of the invention, the inner tight buffered cores 220 are disposed in a linear form thereby simplifying production of the fiber optic cable 300. The linear form of the present invention provides advantages over the spiral or S-Z construction of the prior art in that the conventional spiral or S-Z form requires a comparatively complex manufacturing process involving turning a spool wound with the inner tight buffered cores 220, while the linear form of the present invention does not require such provision. A key feature of the invention is that the inner tight buffered cores 220 are disposed in a linear form, but the outer tight buffered cores 230 are disposed in a spiral or S-Z form, and thus a stable arrangement can be maintained. That is, since the inner and outer tight buffered cores 220 and 230 have a different direction of disposal from each other, they incur minimal failure in their arrangement.

Figure 5:
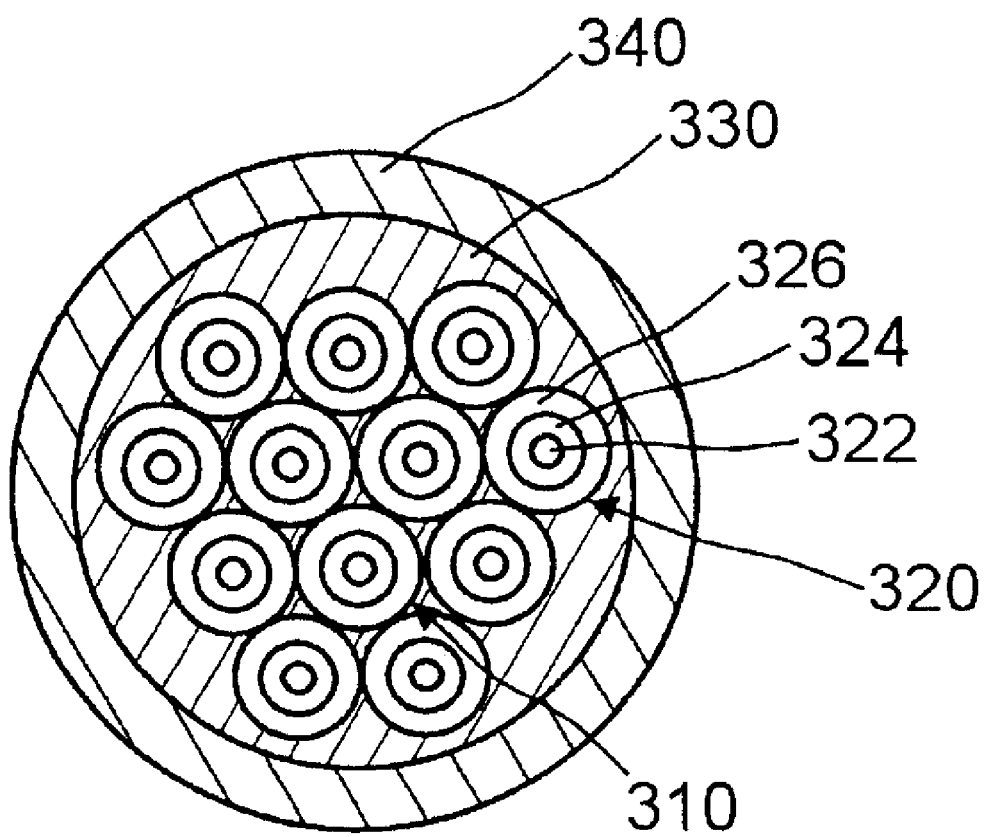
FIG. 5 is a cross-sectional view of a fiber optic indoor/outdoor tight buffered cable according to a second preferred embodiment of the present invention.
Figure 6:
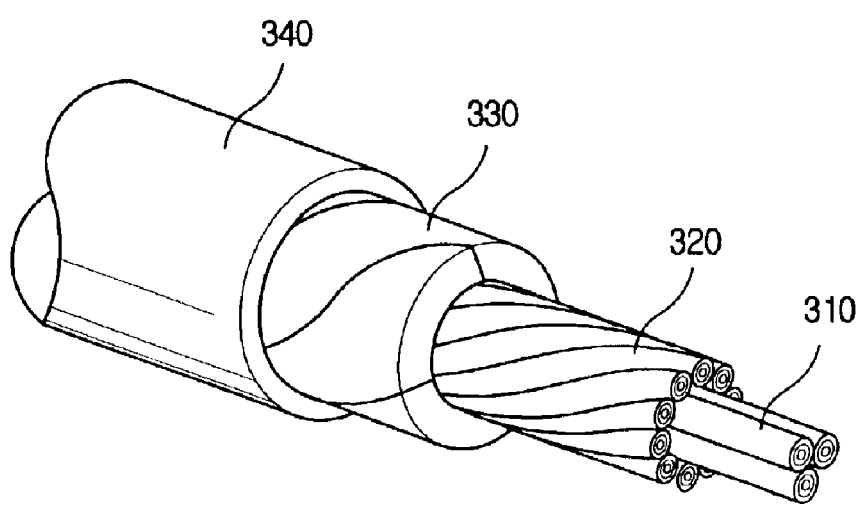
FIG. 6 is a side view of the fiber optic cable shown in FIG. 5.

FIG. 5 is a cross-sectional view of a fiber optic indoor/outdoor tight buffered cable according to a second preferred embodiment of the present invention. FIG. 6 is a side view of the fiber optic cable shown in FIG. 5. The fiber optic cable comprises three inner tight buffered cores 310, nine outer tight buffered cores 320, a strength member 330 and a jacket 340.

The three inner tight buffered cores 310 individually comprise a core 332, a cladding 324 and a tight buffered layer 326. The tight buffered layer 236 may make use of a polymer mixture, such as PVC, hytrel, nylon, PE, polyester, polyolefin or the like. The inner tight buffered cores 310 are disposed at the center of the fiber optic cable and disposed in a linear form.

The nine outer tight buffered cores 320 are disposed in a spiral form to enclose the three inner tight buffered cores 310. Therefore, the nine outer tight buffered cores 320 are spirally twisted at a predetermined pitch. Alternatively, the outer tight buffered cores 320 may be disposed in a S-Z form to enclose the inner tight buffered cores 310.

The strength member 330 is spirally wrapped to enclose the outer tight buffered cores 320, functioning to attenuate external pressure if applied. The outer strength member 330 may be made of aramid yarn or glass yarn.

The jacket 340 is formed around the outermost circumference of the fiber optic cable by an extrusion process, in order to protect the interior of the cable from external environments. The jacket 250 may be made of a polymer mixture, such as PVC, polyolefin, PE or the like.

The foregoing is to be constructed as only being an illustrative embodiment of this invention. Persons skilled in the art can easily conceive of alternative arrangements providing a functionality similar to this embodiment without any deviation from the fundamental principles or the scope of this invention.

What is claimed is:

1. A fiber optic cable, comprising:
    a central strength member, disposed at substantially a central portion of the cable, for providing tensile strength;
    a plurality of inner tight buffered cores disposed in a linear form around the central strength member;
    a plurality of outer tight buffered cores, twisted in one of a spiral and S-Z form, for enclosing and binding the plurality of inner tight buffered cores; and
    a jacket, disposed on an outermost circumference of the cable, for protecting an interior of the cable from external environments,
    wherein each of the inner and outer tight buffered cores includes a core, a cladding, and a tight buffered layer.

2. The fiber optic cable according to claim 1, further comprising an outer strength member, interposed between the outer tight buffered cores and the jacket, for providing tensile strength.

3. The fiber optic cable according to claim 1, wherein the central strength member is constructed of a fiberglass reinforced plastic (FRP) with a layer of polymer combination coated on its circumferential surface.

4. The fiber optic cable according to claim 3, wherein the polymer combination is selected from the group consisting of polyvinyl chlorides (PVC) and polyethylene (PE).

5. The fiber optic cable according to claim 1, wherein said linear form further comprises each of said plurality of inner tight buffered cores being disposed substantially parallel to each other.

6. The fiber optic cable according to claim 1, wherein said plurality of outer tight buffered cores are twisted in one of a spiral and S-Z form at a predetermined pitch.

7. A fiber optic cable, comprising:
    a plurality of inner tight buffered cores disposed at the center of the cable and disposed in a linear form;
    a plurality of outer tight buffered cores, twisted in a spiral or S-Z form, for enclosing and binding the inner tight buffered cores; and
    a jacket, disposed on an outermost circumference of the cable, for protecting an interior of the cable from external environments;
    wherein each of the inner and outer tight buffered cores includes a core, a cladding and a tight buffered layer.

8. The fiber optic cable according to claim 7, comprising an outer strength member, interposed between the outer tight buffered cores and the jacket, for providing tensile strength.

9. The fiber optic cable according to claim 8, wherein the outer strength member is formed from one of the group consisting of aramid yarn and glass yarn.

10. The fiber optic cable according to claim 7, wherein the polymer combination is selected from the group consisting of polyvinyl chlorides (PVC) and polyethylene (PE).

11. The fiber optic cable according to claim 7, wherein said linear form further comprises each of said plurality of inner tight buffered cores being disposed substantially parallel to each other.

12. The fiber optic cable according to claim 7, wherein said plurality of outer tight buffered cores are twisted in one of a spiral and S-Z form at a predetermined pitch.

* * * * *